United States Patent
Wang et al.

(10) Patent No.: US 11,375,209 B2
(45) Date of Patent: Jun. 28, 2022

(54) METHOD AND APPARATUS FOR PROCESSING VIDEO FRAME

(71) Applicant: Beijing Baidu Netcom Science and Technology Co., Ltd., Beijing (CN)

(72) Inventors: Xiaoming Wang, Beijing (CN); Huaifei Xing, Beijing (CN); Wenpeng Ding, Beijing (CN); Huifeng Shen, Beijing (CN); Feifei Cao, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 0 days.

(21) Appl. No.: 16/895,430

(22) Filed: Jun. 8, 2020

(65) Prior Publication Data
US 2021/0195214 A1 Jun. 24, 2021

(30) Foreign Application Priority Data
Dec. 19, 2019 (CN) .......................... 201911314174.4

(51) Int. Cl.
*H04N 19/172* (2014.01)
*H04N 19/167* (2014.01)

(52) U.S. Cl.
CPC ......... *H04N 19/172* (2014.11); *H04N 19/167* (2014.11)

(58) Field of Classification Search
CPC .... H04N 19/172; H04N 19/167; H04N 7/183; H04N 7/188; H04N 5/272; H04N 5/265;
(Continued)

(56) References Cited

U.S. PATENT DOCUMENTS 6,611,268 B1 * 8/2003 Szeliski .................. G06T 7/194
345/473
8,774,458 B2 * 7/2014 Ogawa .................... G06T 7/248
382/103
(Continued)

FOREIGN PATENT DOCUMENTS

CN          102982559 A        3/2013
CN          105989367 A       10/2016
(Continued)

*Primary Examiner* — Joseph G Ustaris
*Assistant Examiner* — Jimmy S Lee
(74) *Attorney, Agent, or Firm* — The Webb Law Firm

(57) ABSTRACT

Embodiments of the present disclosure relate to a method and apparatus for processing a video frame. The method may include: acquiring a sequence of video frames of a video; ascertaining, in the sequence of the video frames, a previous frame, and ascertaining, in the sequence of the video frames, a subsequent frame corresponding to the ascertained previous frame based on acquired number of frames from the previous frame to the subsequent frame. An update step is performed as follows: acquiring object regions detected respectively in the ascertained previous frame and the ascertained subsequent frame, and confidence levels of the object regions; fusing a confidence level of a first object region and a confidence level of a second object region, and updating the confidence level of the second object region based on the fusion result; and updating the ascertained previous frame and the ascertained subsequent frame.

15 Claims, 6 Drawing Sheets

(58) Field of Classification Search
CPC .. H04N 9/873; G06T 7/20; G06T 7/70; G06T 7/269; G06T 7/215; G06T 7/11; G06T 7/246; G06T 2207/20092; G06T 2207/20081; G06T 11/60; G06T 11/001; G06T 5/005; G06K 9/03; G06K 9/00664; G06K 9/0726; G06K 9/00288; G06K 9/00261; G06K 9/00362; G06K 9/00718; G06K 9/6201; G06K 9/00711; G11B 27/036
USPC .................................................. 375/240.02
See application file for complete search history.

(56) References Cited

U.S. PATENT DOCUMENTS

| | | |
|---|---|---|
| 10,223,591 B1 | 3/2019 | Goldenberg et al. |
| 10,922,818 B1* | 2/2021 | Huang ..................... G06T 7/20 |
| 2006/0013564 A1* | 1/2006 | Hamada ............... G11B 27/329 386/248 |
| 2012/0243737 A1* | 9/2012 | Ogawa .................... G06T 7/194 382/103 |
| 2013/0322765 A1* | 12/2013 | Neumann ............... G10L 25/57 382/197 |
| 2016/0224833 A1 | 8/2016 | Jin |
| 2017/0091952 A1* | 3/2017 | Sun ...................... G06K 9/6223 |
| 2019/0050629 A1* | 2/2019 | Olgiati ............... G06K 9/00261 |
| 2019/0066311 A1* | 2/2019 | Traff ....................... G06T 7/248 |
| 2019/0347806 A1* | 11/2019 | Vajapey ................... G06T 7/20 |
| 2020/0151884 A1* | 5/2020 | Vajapey ................... G06T 7/70 |
| 2021/0049771 A1* | 2/2021 | Huang ..................... G06T 7/20 |

FOREIGN PATENT DOCUMENTS

| | | |
|---|---|---|
| CN | 109344789 A | 2/2019 |
| CN | 110287877 A | 9/2019 |

* cited by examiner

METHOD AND APPARATUS FOR PROCESSING VIDEO FRAME

CROSS-REFERENCE TO RELATED APPLICATION

This application claims priority to Chinese Application No. 201911314174.4 filed Dec. 19, 2019, the disclosure of which is hereby incorporated by reference in its entirety.

TECHNICAL FIELD

Embodiments of the present disclosure relate to the field of computer technology, specifically to the field of Internet technology, and particular to a method and apparatus for processing a video frame.

BACKGROUND

With the development of image processing technology, an object may be detected in various video frames using models such as a convolutional neural network.

In the results outputted by these models, for the detected object, the confidence level of the object is generally outputted. In the process of detection, for an object, the confidence level outputted by each video frame may not be uniform. For example, in a first frame, the confidence level of a human face is 0.8, and in a tenth frame, the confidence level of the same face may be 0.4. In practice, a variety of operations may be performed on the object based on the confidence level. Therefore, non-uniform confidence levels may bring various problems.

SUMMARY

Embodiments of the present disclosure provides a method and apparatus for processing a video frame.

In a first aspect, an embodiment of the present disclosure provides a method for processing a video frame, including: acquiring a sequence of video frames of a video; ascertaining, in the sequence of the video frames, a previous frame, and ascertaining, in the sequence of the video frames, a subsequent frame corresponding to the ascertained previous frame based on acquired number of frames from the previous frame to the subsequent frame; and performing a following update step: acquiring object regions detected respectively in the ascertained previous frame and the ascertained subsequent frame, and confidence levels of the object regions; ascertaining respectively a first object region and a second object region containing a same object from an object region of the ascertained previous frame and an object region of the ascertained subsequent frame; fusing a confidence level of the first object region and a confidence level of the second object region, and updating the confidence level of the second object region based on the fusion result; and updating the ascertained previous frame and the ascertained subsequent frame, the updated previous frame being the subsequent frame before the updating, the method further including: performing the update step again, in response to the subsequent frame before the updating not being a last frame of the sequence of the video frames.

In some embodiments, the ascertaining respectively the first object region and the second object region containing the same object from the object region of the ascertained previous frame and the object region of the ascertained subsequent frame includes: ascertaining objects contained in the first object region and an object contained in the second object region being the same object, in response to determining that a degree of overlap between the first object region detected in the ascertained previous frame and the second object region detected in the ascertained subsequent frame is greater than a preset threshold and types of the contained objects are consistent.

In some embodiments, before the acquiring the object regions detected respectively in the ascertained previous frame and the ascertained subsequent frame, the update step further includes: changing the ascertained subsequent frame to the last frame of the sequence of the video frames in response to the ascertained subsequent frame not being in a range of the sequence of the video frames.

In some embodiments, the method further including: ascertaining, from an object region having an updated confidence level in the ascertained subsequent frame, an object region having a confidence level less than a confidence level threshold; and ascertaining the object region having the confidence level less than the confidence level threshold as a non-object region.

In some embodiments, after the updating the confidence level of the second object region based on the fusion result, the update step further includes: determining whether the same object is present in the object region detected in the ascertained subsequent frame and in the object region detected in the ascertained previous frame; and for the acquired video frames, performing, in response to determining that the same object is present in the object region detected in the ascertained subsequent frame and in the object region detected in the ascertained previous frame, linear interpolation processing on a video frame between the ascertained previous frame and the ascertained subsequent frame, to obtain an object region having the same object in the video frame between the ascertained previous frame and the ascertained subsequent frame.

In some embodiments, after the updating the ascertained previous frame and the ascertained subsequent frame, the update step further includes: determining whether the ascertained subsequent frame is the last frame of the sequence of the video frames; stopping performing the update step, in response to determining that the ascertained subsequent frame is the last frame of the sequence of the video frames; and performing the update step again, in response to determining that the ascertained subsequent frame is not the last frame of the sequence of the video frames.

In some embodiments, after the determining whether the same object is present in the object region detected in the ascertained subsequent frame and in the object region detected in the ascertained previous frame, the update step further includes: reducing, in response to determining that the same object is not present in the object region detected in the ascertained subsequent frame and in the object region detected in the ascertained previous frame, the number of the frames from the previous frame to the subsequent frame, and performing the update step again.

In some embodiments, before the determining whether the same object is present in the object region detected in the ascertained subsequent frame and in the object region detected in the ascertained previous frame, the update step further includes: determining, in the update step, whether the ascertained previous frame and the ascertained subsequent frame are adjacent frames; determining whether the ascertained subsequent frame is the last frame of the sequence of the video frames, in response to determining that the ascertained previous frame and the ascertained subsequent frame are the adjacent frames; stopping performing the update step, in response to determining that the ascertained subsequent frame is the last frame of the sequence of the video frames; and performing the update step again, in response to determining that the ascertained subsequent frame is not the last frame of the sequence of the video frames.

In a second aspect, an embodiment of the present disclosure provides an apparatus for processing a video frame, including: an acquiring unit, configured to acquire a sequence of video frames of a video; an ascertaining unit, configured to ascertain, in the sequence of the video frames, a previous frame, and ascertain, in the sequence of the video frames, a subsequent frame corresponding to the ascertained previous frame based on acquired number of frames from the previous frame to the subsequent frame; and an updating unit, configured to perform a following update step: acquiring object regions detected respectively in the ascertained previous frame and the ascertained subsequent frame, and confidence levels of the object regions; ascertaining respectively a first object region and a second object region containing a same object from an object region of the ascertained previous frame and an object region of the ascertained subsequent frame; fusing a confidence level of the first object region and a confidence level of the second object region, and updating the confidence level of the second object region based on the fusion result; and updating the ascertained previous frame and the ascertained subsequent frame, the updated previous frame being the subsequent frame before the updating; and a re-updating unit, configured to perform the update step again, in response to the subsequent frame before the updating not being a last frame of the sequence of the video frames.

In some embodiments, the updating unit is further configured to ascertain respectively the first object region and the second object region containing the same object from the object region of the ascertained previous frame and the object region of the ascertained subsequent frame by: ascertaining objects contained in the first object region and an object contained in the second object region being the same object, in response to determining that a degree of overlap between the first object region detected in the ascertained previous frame and the second object region detected in the ascertained subsequent frame is greater than a preset threshold and types of the contained objects are consistent.

In some embodiments, the updating unit is further configured to: change the ascertained subsequent frame to the last frame of the sequence of the video frames in response to the ascertained subsequent frame not being in a range of the sequence of the video frames, before the object region detected respectively in the ascertained previous frame and the ascertained subsequent frame is acquired.

In some embodiments, the apparatus further including: an area ascertaining unit, configured to ascertain, from an object region having an updated confidence level in the ascertained subsequent frame, an object region having a confidence level less than a confidence level threshold; and an excluding unit, configured to ascertain the object region having the confidence level less than the confidence level threshold as a non-object region.

In some embodiments, the updating unit is further configured to: determine whether the same object is present in the object region detected in the ascertained subsequent frame and in the object region detected in the ascertained previous frame, after the confidence level of the second object region is updated based on the fusion result; and for the acquired video frames, perform, in response to determining that the same object is present in the object region detected in the ascertained subsequent frame and in the object region detected in the ascertained previous frame, linear interpolation processing on a video frame between the ascertained previous frame and the ascertained subsequent frame, to obtain an object region having the same object in the video frame between the ascertained previous frame and the ascertained subsequent frame.

In some embodiments, the updating unit is further configured to: determine whether the ascertained subsequent frame is the last frame of the sequence of the video frames, after the ascertained previous frame and the ascertained subsequent frame are updated; stop performing the update step, in response to determining that the ascertained subsequent frame is the last frame of the sequence of the video frames; and perform the update step again, in response to determining that the ascertained subsequent frame is not the last frame of the sequence of the video frames.

In some embodiments, the updating unit is further configured to: reduce, in response to determining that the same object is not present in the object region detected in the ascertained subsequent frame and in the object region detected in the ascertained previous frame, the number of the frames from the previous frame to the subsequent frame after whether the same object is present in the object region detected in the ascertained subsequent frame and in the object region detected in the ascertained previous frame is determined, and perform the update step again.

In some embodiments, the updating unit is further configured to: determine, in the update step, whether the ascertained previous frame and the ascertained subsequent frame are adjacent frames, before whether the same object is present in the object region detected in the ascertained subsequent frame and in the object region detected in the ascertained previous frame is determined; determine whether the ascertained subsequent frame is the last frame of the sequence of the video frames, in response to determining that the ascertained previous frame and the ascertained subsequent frame are the adjacent frames; stop performing the update step, in response to determining that the ascertained subsequent frame is the last frame of the sequence of the video frames; and perform the update step again, in response to determining that the ascertained subsequent frame is not the last frame of the sequence of the video frames.

In a third aspect, an embodiment of the present disclosure provides an electronic device, the device electronic including: one or more processors; and a storage apparatus, for storing one or more programs, where the one or more programs, when executed by the one or more processors, cause the one or more processors to implement any embodiment of the method for processing a video frame.

In a fourth aspect, an embodiment of the present disclosure provides a computer readable storage medium, storing a computer program thereon, where the program, when executed by a processor, implements any embodiment of the method for processing a video frame.

According to the method and apparatus for processing a video frame provided in embodiments of the present disclosure, the sequence of the video frames of the video is first acquired. Then, the previous frame is ascertained in the sequence of the video frames, and the subsequent frame corresponding to the ascertained previous frame is ascertained in the sequence of the video frames based on the acquired number of the frames from the previous frame to the subsequent frame. Next, the above executing body may perform the following update step: acquiring the object regions detected respectively in the ascertained previous frame and the ascertained subsequent frame, and the confidence levels of the object regions; ascertaining respectively the first object region and the second object region containing the same object from the object region of the ascertained previous frame and the object region of the ascertained subsequent frame; fusing the confidence level of the first object region and the confidence level of the second object region, and updating the confidence level of the second object region based on the fusion result; and updating the ascertained previous frame and the ascertained subsequent frame, the updated previous frame being the subsequent frame before the updating. Finally, the method further includes: performing the update step again, in response to the subsequent frame before the updating not being a last frame of the sequence of the video frames. According to embodiments of the present disclosure, in the situation where the confidence levels detected for the same object in different video frames differ greatly, it is possible to avoid affecting a subsequent operation performed based on the confidence levels. For example, the operation here may be an operation of only adjusting the image quality of an object region having a high confidence level. If the confidence levels of the different video frames differ greatly, the definition of the same object in the different video frames differs greatly. Therefore, embodiments of the present disclosure may ensure that the image quality is relatively uniform in the played video.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
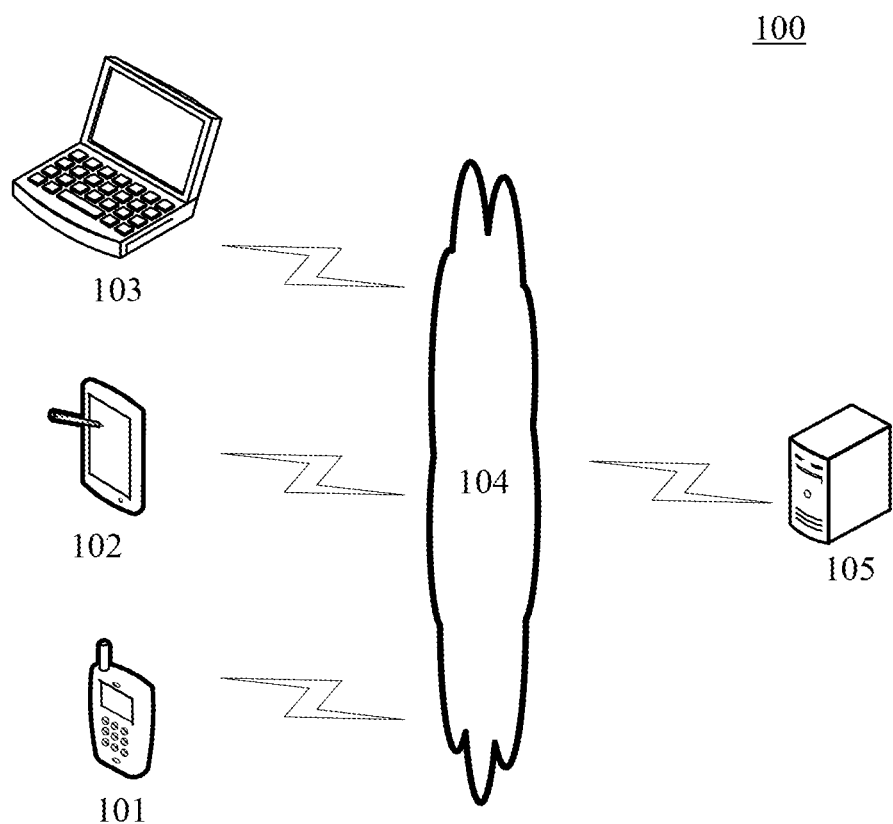
FIG. 1 is a diagram of an example system architecture in which some embodiments of the present disclosure may be implemented.

FIG. 1 illustrates an example system architecture 100 in which a method for processing a video frame or an apparatus for processing a video frame according to embodiments of the present disclosure may be implemented.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 by using the terminal devices 101, 102 and 103, to receive or send a message, etc. Various communication client applications (e.g., a video frame processing application, a video application, a live streaming application, an instant communication tool, a mailbox client and social platform software) may be installed on the terminal devices 101, 102 and 103.

The terminal devices 101, 102 and 103 here may be hardware or software. When being the hardware, the terminal devices 101, 102 and 103 may be various electronic devices having a display screen, the electronic devices including, but not limited to, a smart phone, a tablet computer, an e-book reader, a laptop portable computer, a desktop computer, etc. When being the software, the terminal devices 101, 102 and 103 may be installed in the above listed electronic devices. The terminal devices may be implemented as a plurality of pieces of software or a plurality of software modules (e.g., software or software modules for providing a distributed service), or may be implemented as a single piece of software or a single software module, which will not be specifically defined here.

The server 105 may be a server providing various services, for example, a backend server providing support for the terminal devices 101, 102 and 103. The backend server may perform processing such as an analysis on data such as an acquired sequence of the video frames, and feedback the processing result (e.g., an updated confidence level) to the terminal devices.

It should be noted that the method for processing a video frame provided in embodiments of the present disclosure may be performed by the server 105, or performed by the terminal devices 101, 102 and 103. Correspondingly, the apparatus for processing a video frame may be provided in the server 105, or provided in the terminal devices 101, 102 and 103.

It should be appreciated that the numbers of the terminal devices, the networks and the servers in FIG. 1 are merely illustrative. Any number of terminal devices, networks and servers may be provided based on actual requirements.

Figure 2:
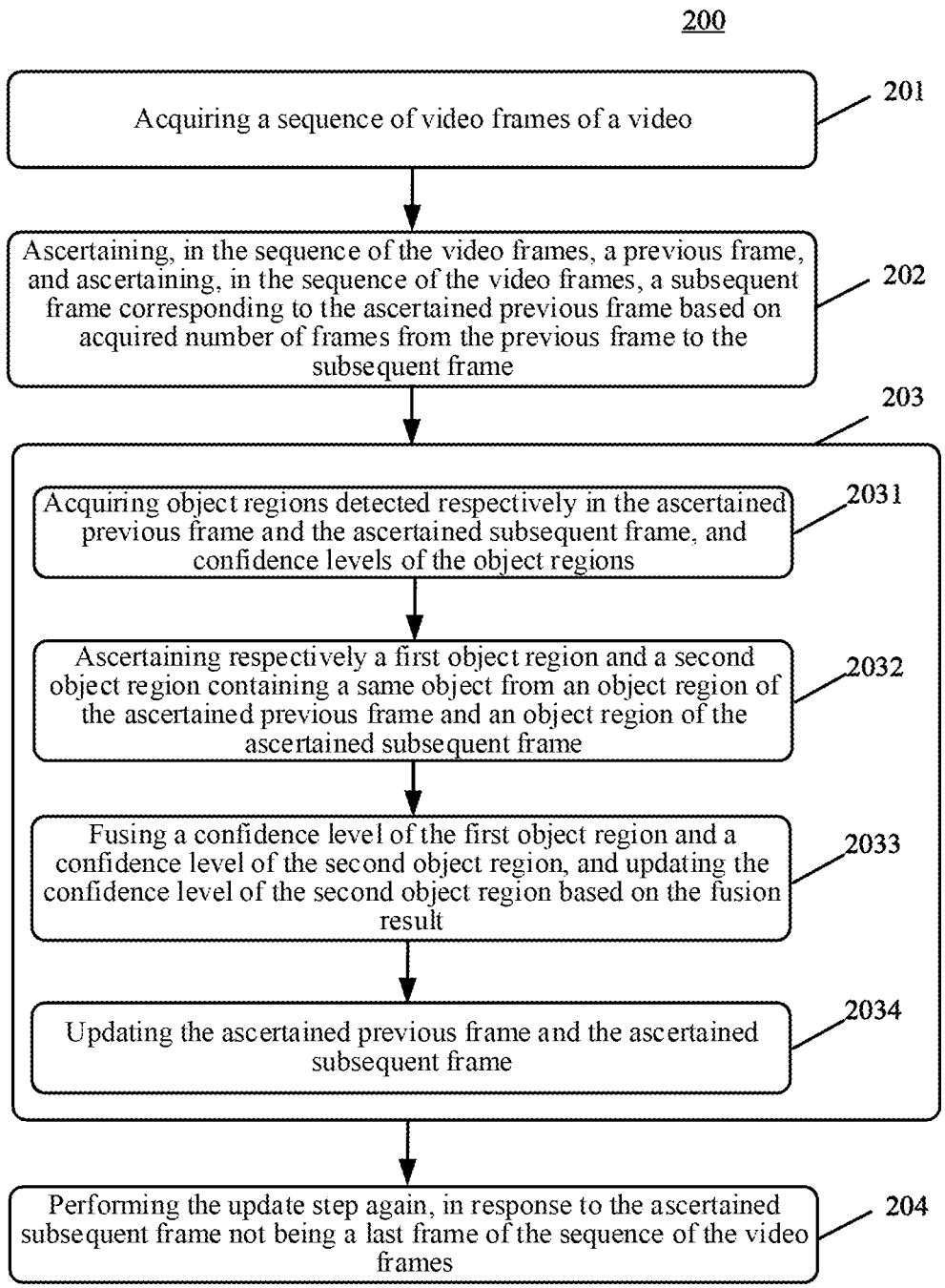
FIG. 2 is a flowchart of a method for processing a video frame according to an embodiment of the present disclosure.

Further referring to FIG. 2, FIG. 2 illustrates a flow 200 of a method for processing a video frame according to an embodiment of the present disclosure. The method for processing a video frame includes the following steps.

Step 201, acquiring a sequence of video frames of a video.

In this embodiment, an executing body (e.g., the server or the terminal devices shown in FIG. 1) of the method for processing a video frame may acquire the sequence of the video frames of the video. Specifically, the sequence of the video frames is a sequence in which the video frames are arranged in a play order of a video. For example, the sequence of the video frames is a plurality of video frames of a movie, the first element of the sequence is the first frame of the movie, the second element of the sequence is the second frame of the movie, and so on.

Step 202, ascertaining, in the sequence of the video frames, a previous frame, and ascertaining, in the sequence of the video frames, a subsequent frame corresponding to the ascertained previous frame based on acquired number of frames from the previous frame to the subsequent frame.

In this embodiment, in the acquired sequence of the video frames, the above executing body may ascertain the previous frame and then ascertain the subsequent frame. The previous frame may be the first frame in the sequence of the video frames, or may be any frame preset in the sequence of the video frames. Specifically, the above executing body may ascertain the subsequent frame based on the acquired number of frames from the previous frame to the subsequent frame in various ways. For example, the number of the frames from the previous frame to the subsequent frame is 5. If the ascertained previous frame is the first frame, then the fifth one starting from the first frame of the sequence of the video frames is the fifth frame. Therefore, the subsequent frame is the fifth frame. In practice, the update step may be performed several times in a loop, and the number of the frames from the previous frame to the subsequent frame used each time may be different.

In practice, the above number of the frames from the previous frame to the subsequent frame may be represented as a sliding window. The above executing body may ascertain a plurality of video frame pairs (i.e., previous frames and subsequent frames) from the sequence of the video frames based on the sliding window. The previous frame is at one end (e.g., the front end) of the sliding window and the subsequent frame is at the other end (e.g., the tail end) of the sliding window.

The following update step 203 (i.e., steps 2031-2034) is performed.

Step 2031, acquiring object regions detected respectively in the ascertained previous frame and the ascertained subsequent frame, and confidence level of the object regions.

In this embodiment, the above executing body may acquire the object region detected in the ascertained previous frame and the confidence level of the object region. In addition, the above executing body may also acquire the object region detected in the ascertained subsequent frame and the confidence level of the object region. Specifically, the acquired object region may refer to a position of the object region in a target video frame, or may refer to an area image matrix at the position of the object region in the target video frame.

In practice, the above executing body may acquire the detected object region and the confidence level of the object region in various ways. For example, the above executing body may directly acquire a detection result locally or from other electronic devices. In addition, the above executing body may further detect the previous frame and the subsequent frame, to obtain the object regions and the confidence levels.

In some alternative implementations of this embodiment, before step 2031, the update step may further include: changing the ascertained subsequent frame to the last frame of the sequence of the video frames in response to the ascertained subsequent frame not being in a range of the sequence of the video frames.

In these alternative implementations, in the situation where the ascertained subsequent frame is not in the range of the sequence of the video frames, the above executing body may not use the ascertained subsequent frame, but change the ascertained subsequent frame. Specifically, the last frame of the sequence of the video frames may be used as the subsequent frame after the changing. For example, if the ascertained subsequent frame is the 1000th frame and the last frame of the sequence of the video frames is the 998th frame, the above executing body may use the 998th frame as the subsequent frame corresponding to the ascertained previous frame. In the situation where the sliding window is used, the above executing body may reduce the length of the sliding window, such that the tail end of the sliding window (i.e., the other end other than the end corresponding to the previous frame) corresponds to the last frame of the sequence of the video frames.

According to these implementations, in the situation where a given subsequent frame is out of the range of the sequence of the video frames, an appropriate subsequent frame may be re-ascertained for the specific situation of the sequence of the video frames.

Step 2032, ascertaining respectively a first object region and a second object region containing a same object from an object region of the ascertained previous frame and an object region of the ascertained subsequent frame.

In this embodiment, the above executing body may ascertain the first object region from the ascertained previous frame, and ascertain the second object region from the ascertained subsequent frame. Here, the first object region and the second object region contain the same object. For example, if the face of Zhang San is contained at a position in the previous frame, and the face of Zhang San is also contained at a similar position in the subsequent frame, the area having the face of Zhang San in the previous frame and the area having the face of Zhang San in the subsequent frame are respectively the first object region and the second object region. In practice, the above executing body may use the first object region and the second object region as a set of paired object regions, and the above executing body may detect one or more sets of paired object regions from the previous frame and the subsequent frame.

In some alternative implementations of this embodiment, the step 2032 may include: ascertaining an object contained in the first object region and an object contained in the second object region being the same object, in response to determining that a degree of overlap between the first object region detected in the ascertained previous frame and the second object region detected in the ascertained subsequent frame is greater than a preset threshold and types of the contained objects are consistent.

In these alternative implementations, if a degree of overlap between one object region in the previous frame and another object region in the subsequent frame is large, and the types of objects contained in the object regions are consistent, it may be ascertained that the objects in the two object regions are the same object. Then, the above executing body may respectively use the two object regions as the first object region and the second object region.

Specifically, the degree of overlap herein may be an intersection-to-union ratio, i.e., a ratio of an intersection of two object regions to a union of the two object regions. The type of the object may be various, for example, a face type or a head type, or may be a body type, a text type, an animal type, an item type, or the like.

In practice, the detection result of detecting a video frame may include not only a detected object region and a confidence level, but also the type of an object in the object region. Thus, the above executing body may acquire the detected type. The type acquired herein may be represented as text, a label and/or a letter. Therefore, the above executing body may ascertain whether the type of the object in the first object region is consistent with the type of the object in the second object region.

These implementations may quickly and accurately ascertain the first object region and the second object region containing the same object, by ascertaining the degree of overlap and comparing the types of the objects.

Step 2033, fusing a confidence level of the first object region and a confidence level of the second object region, and updating the confidence level of the second object region based on the fusion result.

In this embodiment, the above executing body may fuse the confidence level of the first object region and the confidence level of the second object region. Thereafter, the above executing body may update the confidence level of the second object region based on the fusion result.

In practice, the above executing body may perform the fusion in various ways. For example, the above executing body may set weights to the confidence level of the first object region and the confidence level of the second object region. For example, the above executing body may set the weight of the confidence level $P_2$ of the second object region to be $\lambda$, and set the weight of the confidence level $P_1$ of the first object region to be $1-\lambda$, the confidence level $P_2'$ of the second object region that is obtained through the fusion may be represented as: $P_2'=\lambda P_2+(1-\lambda)P_1$. In addition, the above executing body may further input the confidence level of the first object region and the confidence level of the second object region into a preset confidence level fusion model, and obtain the fusion result from the confidence level fusion model. Specifically, the confidence level fusion model herein may be a corresponding relationship table representing a corresponding relationship of the confidence level of the first object region and the confidence level of the second object region to the confidence level obtained through the fusion, or may be a formula or a deep neural network representing the corresponding relationship.

In some alternative implementations of this embodiment, after step 2033, the above method may further include: ascertaining, from object regions having updated confidence levels in the ascertained subsequent frame, an object region having a confidence level less than a confidence level threshold; and ascertaining the object region having the confidence level less than the confidence level threshold as a non-object region.

In these alternative implementations, the above executing body may ascertain, from the object region having the updated confidence levels in the ascertained subsequent frame, the object region having the confidence level less than the confidence level threshold as the non-object region. That is, the object region having the confidence level less than the confidence level threshold is deleted from the acquired object regions. In this way, an object region having a small confidence level does not participate in a subsequent operation on the object region.

According to these implementations, object regions having a more uniform confidence level may be acquired from the frames through the fusion result of the confidence levels, to perform subsequent processing. In addition, by taking only an object region having a high confidence level, the acquisition of a wrong detection result may be avoided, which avoids the waste of calculation resources caused by subsequent operations on these object regions.

In some alternative implementations of this embodiment, after step 2033, the method may further include: determining, in the update step, whether the ascertained previous frame and the ascertained subsequent frame are adjacent frames; determining whether the ascertained subsequent frame is the last frame of the sequence of the video frames, in response to determining that the ascertained previous frame and the ascertained subsequent frame are the adjacent frames; stopping performing the update step, in response to determining that the ascertained subsequent frame is the last frame of the sequence of the video frames; and performing the update step again, in response to determining that the ascertained subsequent frame is not the last frame of the sequence of the video frames.

In these alternative implementations, the above executing body may determine, in the update step, whether the ascertained previous frame and the ascertained subsequent frame are adjacent frames. If it is determined that the ascertained previous frame and the ascertained subsequent frame are the adjacent frames, then the above executing body may determine whether the ascertained subsequent frame is the last frame of the sequence of the video frames. If it is determined that the ascertained subsequent frame is the last frame, the above executing body may finish the flow. If it is determined that the ascertained subsequent frame is not the last frame, the above executing body may perform the update step again. In the situation where the previous frame and the subsequent frame are the adjacent frames, the above number of the frames from the previous frame to the subsequent frame is 2. Specifically, the number of the frames from the previous frame to the subsequent frame used by the above executing body in the process of performing the above update step may be less than that in the last update step.

According to these implementations, in the situation where the previous frame and the subsequent frame are adjusted to adjacent frames because the object in the previous frame and the object in the subsequent frame are different, whether all video frames are processed is determined, thereby ensuring the complete processing for the sequence of the video frames.

Step 2034, updating the ascertained previous frame and the ascertained subsequent frame, the updated previous frame being the subsequent frame before the updating.

In this embodiment, the above executing body may update the ascertained previous frame using the current subsequent frame that is ascertained. Specifically, the above executing body may directly use the subsequent frame that is not updated this time as the updated previous frame.

In practice, the above executing body may ascertain the updated subsequent frame based on the updated previous frame and the current number of the frames from the previous frame to the subsequent frame. Specifically, the current number of the frames from the previous frame to the subsequent frame may be initially acquired, or may be updated.

For example, the current previous frame of the sequence of the video frames is the first frame and the subsequent frame is the fourth frame. The above executing body may update the previous frame to the fourth frame. If the number of the frames from the previous frame to the subsequent frame is 3, then the ascertained subsequent frame after the updating is the sixth frame.

Step 204, performing the update step again, in response to the ascertained subsequent frame not being a last frame of the sequence of the video frames.

In this embodiment, in the situation where the ascertained subsequent frame is not the last frame of the sequence of the video frames, the above executing body may perform the update step (i.e., steps 2031-2034) again.

In practice, in a plurality of scenarios, the above executing body may ascertain the current situation where the subsequent frame is not the last frame of the above sequence of video frames. For example, if the above executing body has ascertained in the process of performing the update step that the subsequent frame is not the last frame of the above sequence of video frames, the above executing body may directly ascertain the current situation where the subsequent frame is not the last frame of the above sequence of video frames. In addition, the above executing body may ascertain whether the current subsequent frame is the last frame of the sequence of the video frames in real time, thereby ascertaining the current situation of whether the subsequent frame is not the last frame of the sequence of the video frames.

According to this embodiment, in the situation where the confidence levels detected for the same object in different video frames differ greatly, it is possible to avoid affecting a subsequent operation performed based on the confidence levels. For example, the operation here may be an operation of only adjusting the image quality of an object region having a high confidence level. If the confidence levels of the different video frames differ greatly, the definition of the same object in the different video frames differs greatly. Therefore, this embodiment may ensure that the image quality is relatively uniform in the played video.

Figure 3:
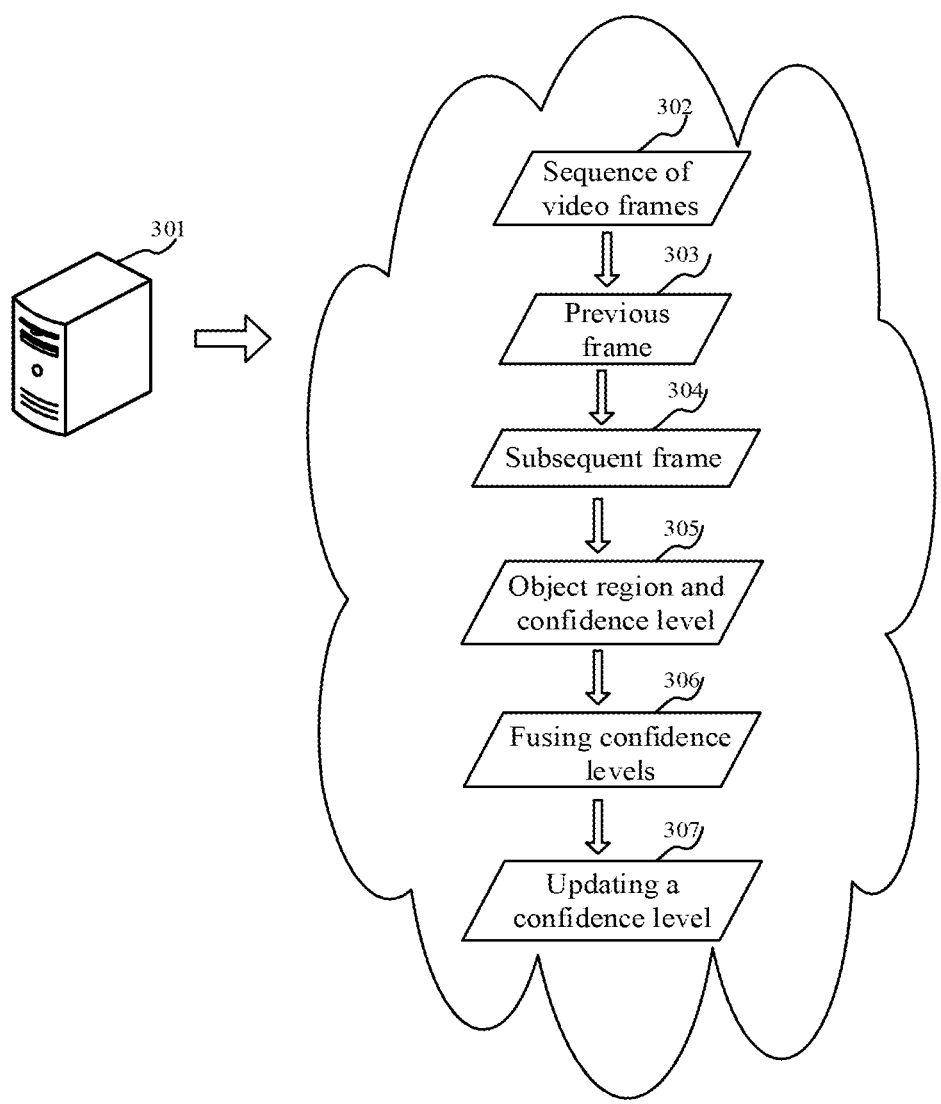
FIG. 3 is a schematic diagram of an application scenario of the method for processing a video frame according to the present disclosure.

Further referring to FIG. 3, FIG. 3 is a schematic diagram of an application scenario of the method for processing a video frame according to this embodiment. In the application scenario of FIG. 3, an executing body 301 may acquire a sequence of video frames 302 of a video. A previous frame 303 (e.g., a first frame) is ascertained in the sequence of the video frames 302, and a subsequent frame 304 (i.e., a fifth frame) corresponding to the ascertained previous frame 303 is ascertained in the sequence of the video frames based on acquired number of frames (e.g., 5) from the previous frame to the subsequent frame. An update step is performed as follows: object regions detected respectively in the ascertained previous frame and the ascertained subsequent frame and confidence levels 305 of the object regions are acquired. A first object region and a second object region containing a same object are respectively ascertained from an object region of the ascertained previous frame and an object region of the ascertained subsequent frame. A confidence level (e.g., 0.8) of the first object region and a confidence level (e.g., 0.4) of the second object region are fused (306), and, based on the fusion result (e.g., 0.6), the confidence level of the second object region is updated (307). The executing body 301 updates the ascertained previous frame and the ascertained subsequent frame, and the updated previous frame is the subsequent frame before the updating. The method further includes the following step. The executing body 301 performs the update step again, in response to the subsequent frame before the updating not being a last frame of the sequence of the video frames.

Figure 4A:
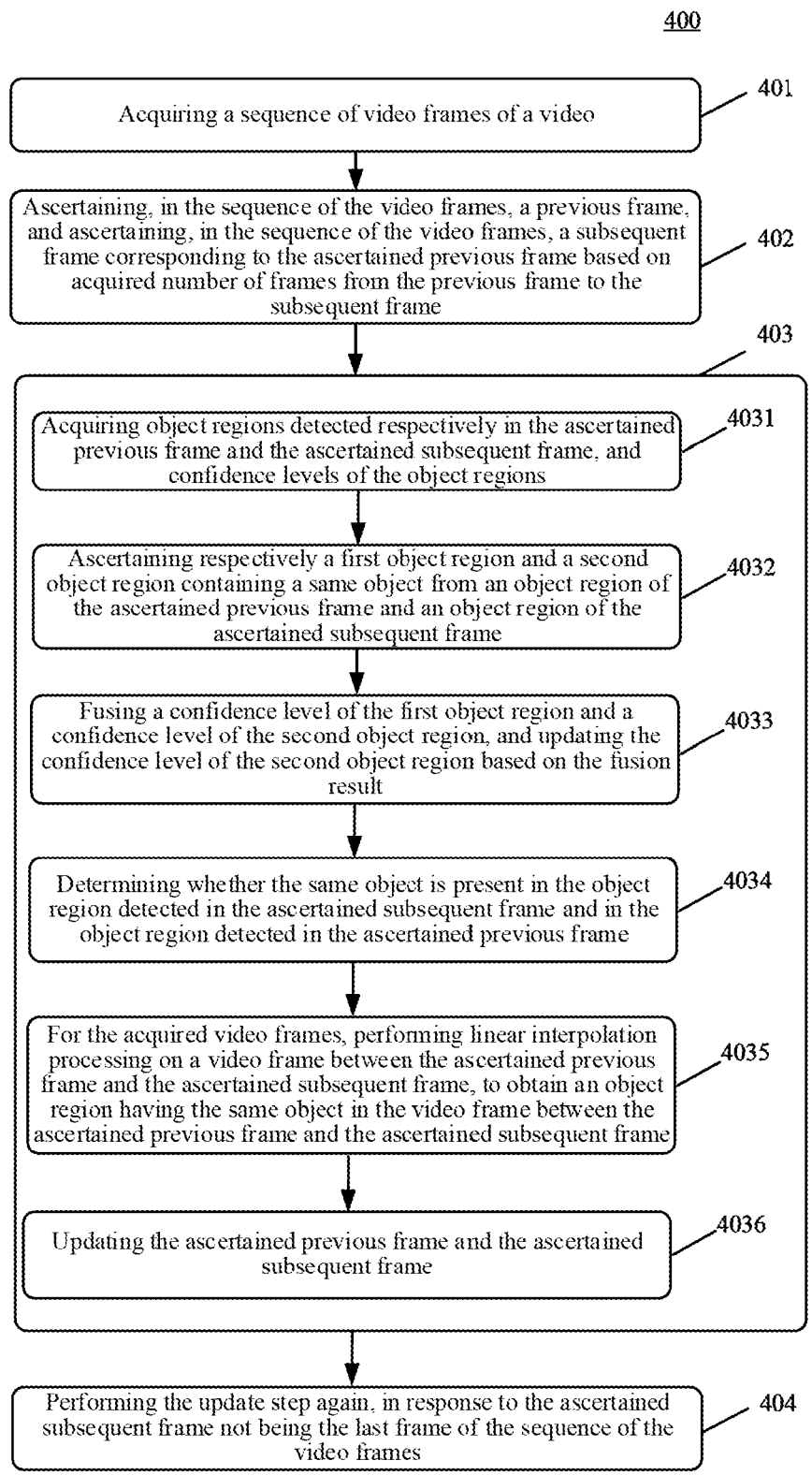
FIG. 4a is a flowchart of the method for processing a video frame according to another embodiment of the present disclosure.

Further referring to FIG. 4a, FIG. 4a illustrates a flow 400 of another embodiment of the method for processing a video frame. The flow 400 of the method for processing a video frame includes the following steps.

Step 401, acquiring a sequence of video frames of a video.

In this embodiment, an executing body (e.g., the server or the terminal devices shown in FIG. 1) of the method for processing a video frame may acquire the sequence of the video frames of the video. Specifically, the sequence of the video frames is a sequence in which the video frames are arranged in a play order of a video. For example, the sequence of the video frames is a plurality of video frames of a movie, the first element of the sequence is the first frame of the movie, the second element of the sequence is the second frame of the movie, and so on.

Step 402, ascertaining, in the sequence of the video frames, a previous frame, and ascertaining, in the sequence of the video frames, a subsequent frame corresponding to the ascertained previous frame based on acquired number of frames from the previous frame to the subsequent frame.

In this embodiment, in the acquired sequence of the video frames, the above executing body may ascertain the previous frame and then ascertain the subsequent frame. Specifically, the above executing body may ascertain the subsequent frame based on the acquired number of the frames from the previous frame to the subsequent frame in various ways.

The following update step (steps 4031-4036) is performed.

Step 4031, acquiring object regions detected respectively in the ascertained previous frame and the ascertained subsequent frame, and confidence levels of the object regions.

In this embodiment, the above executing body may acquire the object region detected in the ascertained previous frame and the confidence level of the object region. In addition, the above executing body may also acquire the object region detected in the ascertained subsequent frame and the confidence level of the object region. Specifically, the acquired object region may refer to a position of the object region in a target video frame, or may refer to an area image matrix at the position of the object region in the target video frame.

Step 4032, ascertaining respectively a first object region and a second object region containing a same object from an object region of the ascertained previous frame and an object region of the ascertained subsequent frame.

In this embodiment, the above executing body may ascertain the first object region from the ascertained previous frame, and ascertain the second object region from the ascertained subsequent frame. Here, the first object region and the second object region contain the same object.

Step 4033, fusing a confidence level of the first object region and a confidence level of the second object region, and updating the confidence level of the second object region based on the fusion result.

In this embodiment, the above executing body may fuse the confidence level of the first object region and the confidence level of the second object region. Thereafter, the above executing body may update the confidence level of the second object region based on the fusion result.

Step 4034, determining whether the same object is present in the object region detected in the ascertained subsequent frame and in the object region detected in the ascertained previous frame.

In this embodiment, the above executing body may determine whether the same object is present in the subsequent frame and in the previous frame. Specifically, the above executing body may perform the determining based on a degree of overlap between the object regions having the objects and types of the objects.

In some alternative implementations of this embodiment, after step 4034, the above update step may further include: reducing, in response to determining that the same object is not present in the object region detected in the ascertained subsequent frame and in the object region detected in the ascertained previous frame, the number of the frames from the previous frame to the subsequent frame, and performing the update step again.

In these alternative implementations, in response to determining that the same object is not present in the current subsequent frame and in the previous frame, the above executing body may perform the reduction process on the acquired number of the frames from the previous frame to the subsequent frame to obtain the reduced number of frames, and perform the update step again. Here, when the update step is performed again, the number of the frames from the previous frame to the subsequent frame is the reduced number. For example, the current number of the frames from the previous frame to the subsequent frame is 5, and the number after the reduction may be 4 or 3. In practice, the above executing body may realize the above reduction process by reducing the length of a sliding window, that is, reducing the number of the frames contained in the sliding window.

According to these implementations, in the situation where the objects in the previous frame and the subsequent frame do not match, the number of the frames between the previous frame and the subsequent frame may be reduced. In this way, a similarity between the previous frame and the subsequent frame may be increased, thereby increasing the probability that the object in the subsequent frame and the object in the previous frame are paired. Moreover, according to these implementations, the problem that object regions in other video frames obtained through interpolation processing are inaccurate that is caused because the previous frame is too far apart from the subsequent frame and the similarity is low may be avoided.

In some alternative implementations of this embodiment, before step 4034, the update step may further include: determining, in the update step, whether the ascertained previous frame and the ascertained subsequent frame are adjacent frames; determining whether the ascertained subsequent frame is the last frame of the sequence of the video frames, in response to determining that the ascertained previous frame and the ascertained subsequent frame are the adjacent frames; stopping performing the update step, in response to determining that the ascertained subsequent frame is the last frame of the sequence of the video frames; and performing the update step again, in response to determining that the ascertained subsequent frame is not the last frame of the sequence of the video frames.

In these alternative implementations, the above executing body may determine, in the update step, whether the ascertained previous frame and the ascertained subsequent frame are the adjacent frames. If it is determined that the ascertained previous frame and the ascertained subsequent frame are the adjacent frames, the above executing body may determine whether the ascertained subsequent frame is the last frame of the sequence of the video frames. If it is determined that the ascertained subsequent frame is the last frame of the sequence of the video frames, the above executing body may stop the process. If it is determined that the ascertained subsequent frame is not the last frame of the sequence of the video frames, the above executing body may perform the update step again. In the situation where the previous frame and the subsequent frame are the adjacent frames, the above number of the frames from the previous frame to the subsequent frame is 2. Specifically, the number of the frames from the previous frame to the subsequent frame used by the above executing body in the process of performing the above update step may be less than that in the last update step.

According to these implementations, in the situation where the previous frame and the subsequent frame are adjusted to adjacent frames because the object in the previous frame and the object in the subsequent frame are different, whether all video frames are processed is determined, thereby ensuring the complete processing for the sequence of the video frames.

In some alternative application scenarios of these implementations, after the determining, in the update step, whether the ascertained previous frame and the ascertained subsequent frame are adjacent frames, the update step may further include: continuing to perform the update step, in response to determining that the ascertained previous frame and the ascertained subsequent frame are not the adjacent frames.

In these alternative application scenarios, the above executing body may continue to perform the update step in the situation where it is determined that the ascertained previous frame and the ascertained subsequent frame are not the adjacent frames. For example, the above executing body may perform step 4034.

Step 4035, for the acquired video frames, performing, in response to determining that the same object is present in the object region detected in the ascertained subsequent frame and in the object region detected in the ascertained previous frame, linear interpolation processing on a video frame between the ascertained previous frame and the ascertained subsequent frame, to obtain an object region having the same object in the video frame between the ascertained previous frame and the ascertained subsequent frame.

In this embodiment, if the determination result is that the same object is present in the previous frame and the subsequent frame, the above executing body may perform the linear interpolation processing on the video frame between the previous frame and the subsequent frame, and thus, the object region having the same object in the video frame between the previous frame and the subsequent frame may be obtained. For example, if the previous frame is a fifth frame containing a human face, and the subsequent frame is a tenth frame containing the human face, the video frames between the previous frame and the subsequent frame are a sixth frame, a seventh frame, an eighth frame and a ninth frame. The above executing body may ascertain the object region having the human face in the sixth frame, the seventh frame, the eighth frame and the ninth frame, respectively.

Step 4036, updating the ascertained previous frame and the ascertained subsequent frame, the updated previous frame being the subsequent frame before the updating.

In this embodiment, the above executing body may update the ascertained previous frame using the current subsequent frame that is ascertained. Specifically, the above executing body may directly use the subsequent frame that is not updated this time as the updated previous frame.

In some alternative implementations of this embodiment, after step 4036, the update step may further include: determining whether the ascertained subsequent frame is the last frame of the sequence of the video frames; stopping performing the update step, in response to determining that the ascertained subsequent frame is the last frame of the sequence of the video frames; and performing the update step again, in response to determining that the ascertained subsequent frame is not the last frame of the sequence of the video frames.

In these alternative implementations, after performing the interpolation processing, the above executing body may determine whether the ascertained subsequent frame is the last frame of the sequence of the video frames. The determination result here may be used as a basis of whether the above executing body performs the update step again. If the determination result is yes, the above executing body may finish the flow, and if the determination result is no, the above executing body may perform the update step again.

According to these implementations, after the interpolation processing is performed, whether the processing on the video frame is completed is determined, thereby accurately performing a next operation.

Figure 4B:
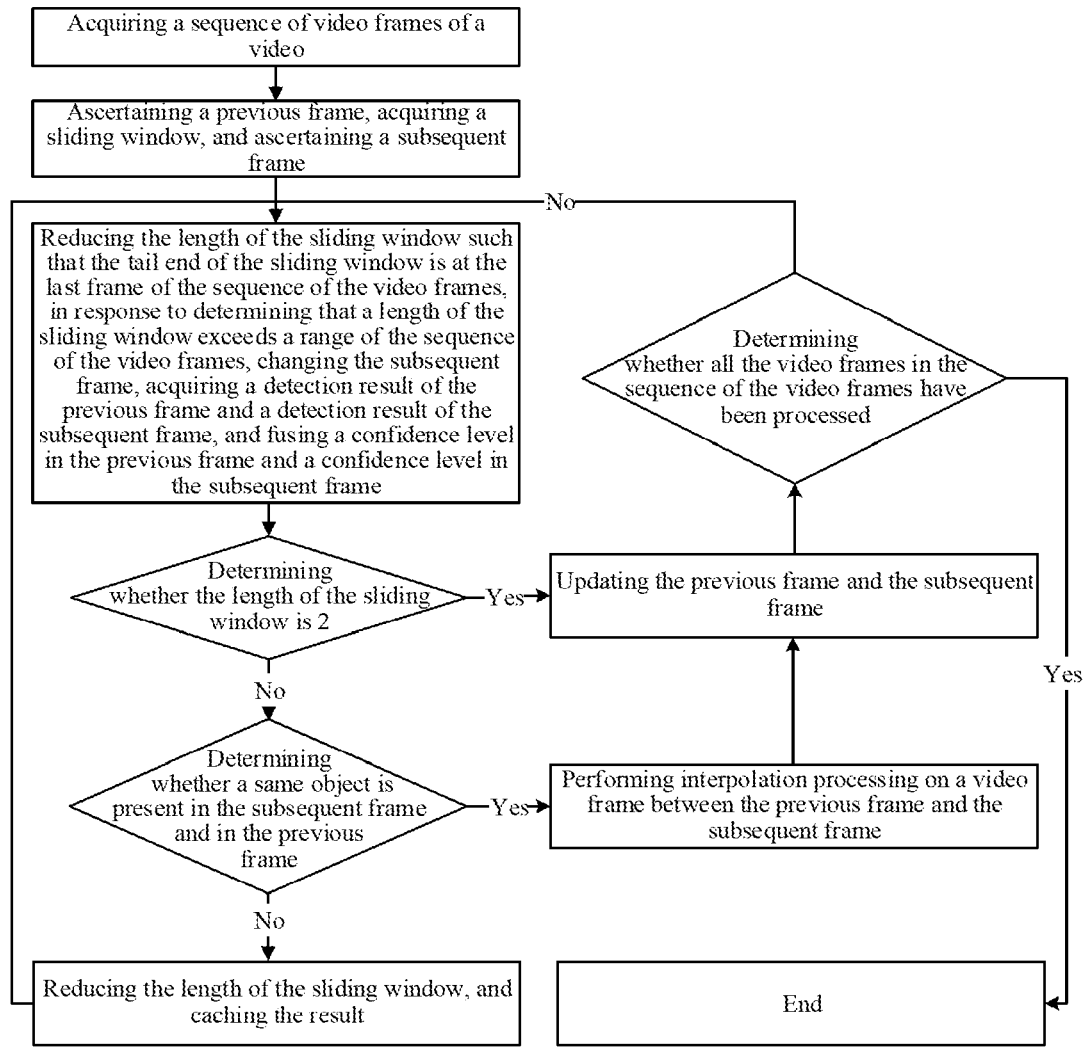
FIG. 4b is a flowchart of the method for processing a video frame according to another embodiment of the present disclosure.

As shown in FIG. 4b, FIG. 4b illustrates a video frame processing flow. Specifically, the above executing body may acquire a sequence of video frames. Thereafter, the above executing body may ascertain a previous frame (e.g., a first frame) and acquire the length (e.g., 10 frames) of a sliding window, thereby ascertaining a subsequent frame (i.e., a tenth frame). If the length of the sliding window exceeds the range of the sequence of the video frames, the above executing body may reduce the length of the sliding window, such that the tail end of the sliding window is at the last frame of the sequence of the video frames, thereby realizing the change for the subsequent frame. Then, the above executing body may acquire a detection result of the previous frame and a detection result of the subsequent frame, and perform confidence level fusion on the confidence level of a first object region in the previous frame and the confidence level of a second object region in the subsequent frame, to obtain a fusion result. Thus, the confidence level of the second object region is updated to the fusion result. Then, the above executing body may ascertain whether the length of the sliding window is 2, and in the situation where the length is 2, update the previous frame and the subsequent frame and clean up the previous frame and the subsequent frame before the updating in the cache. In the situation where the length is not 2, the above executing body may determine whether a same object is present in the previous frame and in the subsequent frame. If the same object is not present in the previous frame and in the subsequent frame, the above executing body may reduce the length of the sliding window. If the same object is present in the previous frame and in the subsequent frame, the above executing body may perform linear interpolation processing on a video frame between the previous frame and the subsequent frame. Then, the above executing body may update the previous frame and the subsequent frame. If the above executing body determines that all the video frames in the sequence of the video frames have been processed, that is, the subsequent frame is the last frame of the sequence of the video frames, the above executing body may finish the flow.

Step 404, performing the update step again, in response to the ascertained subsequent frame not being the last frame of the sequence of the video frames.

In this embodiment, in the situation where the ascertained subsequent frame is not the last frame of the sequence of the video frames, the above executing body may perform the above update step (i.e., steps 4031-4036) again.

In this embodiment, the object region of an intermediate frame may be quickly ascertained through the linear interpolation processing. Moreover, in this embodiment, the interpolation processing is performed only when the same object is present in the subsequent frame and in the previous frame, and thus, it may be ensured that the similarity between the previous frame and the subsequent frame is high, which further improves the accuracy of the interpolation processing result.

Figure 5:
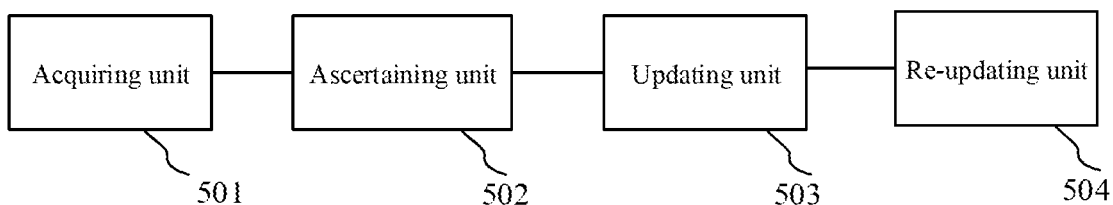
FIG. 5 is a schematic structural diagram of an apparatus for processing a video frame according to an embodiment of the present disclosure.

Further referring to FIG. 5, as an implementation of the method shown in the above drawings, an embodiment of the present disclosure provides an apparatus for processing a video frame. The embodiment of the apparatus corresponds to the embodiment of the method shown in FIG. 2. In addition to the features described below, the embodiment of the apparatus may further include features or effects identical or corresponding to those in the embodiment of the method shown in FIG. 2. The apparatus may be applied in various electronic devices.

As shown in FIG. 5, the apparatus 500 for processing a video frame in this embodiment includes an acquiring unit 501, an ascertaining unit 502, an updating unit 503 and a re-updating unit 504. The acquiring unit 501 is configured to acquire a sequence of video frames of a video. The ascertaining unit 502 is configured to ascertain, in the sequence of the video frames, a previous frame, and ascertain, in the sequence of the video frames, a subsequent frame corresponding to the ascertained previous frame based on acquired number of frames from the previous frame to the subsequent frame. The updating unit 503 is configured to perform a following update step: acquiring object regions detected respectively in the ascertained previous frame and the ascertained subsequent frame, and confidence levels of the object regions; ascertaining respectively a first object region and a second object region containing a same object from an object region of the ascertained previous frame and an object region of the ascertained subsequent frame; fusing a confidence level of the first object region and a confidence level of the second object region, and updating the confidence level of the second object region based on the fusion result; and updating the ascertained previous frame and the ascertained subsequent frame, the updated previous frame being the subsequent frame before the updating. The re-updating unit 504 is configured to perform the update step again, in response to the subsequent frame before the updating not being a last frame of the sequence of the video frames.

In some embodiments, the acquiring unit 501 in the apparatus 500 for processing a video frame may acquire the sequence of the video frames of the video. Specifically, the sequence of the video frames is a sequence in which the video frames are arranged in a play order of a video. For example, the sequence of the video frames is a plurality of video frames of a movie, the first element of the sequence is the first frame of the movie, the second element of the sequence is the second frame of the movie, and so on.

In some embodiments, in the acquired sequence of the video frames, the ascertaining unit 502 may ascertain the previous frame and then ascertain the subsequent frame. The previous frame may be the first frame of the sequence of the video frames, or may be any preset frame in the sequence of the video frames. Specifically, the above executing body may ascertain the subsequent frame based on the acquired number of the frames from the previous frame to the subsequent frame in various ways.

In some embodiments, the updating unit 503 acquires the object regions detected respectively in the ascertained previous frame and the ascertained subsequent frame, and the confidence levels of the object regions; ascertains respectively the first object region and the second object region containing the same object from the object region of the ascertained previous frame and the object region of the ascertained subsequent frame; fuses the confidence level of the first object region and the confidence level of the second object region, and updates the confidence level of the second object region based on the fusion result; and updates the ascertained previous frame and the ascertained subsequent frame, the updated previous frame being the subsequent frame before the updating.

In some embodiments, the re-updating unit 504 performs the update step again, in the situation where the ascertained subsequent frame is not the last frame of the sequence of the video frames.

In some alternative implementations of this embodiment, the updating unit is further configured to ascertain respectively the first object region and the second object region containing the same object from the object region of the ascertained previous frame and the object region of the ascertained subsequent frame by: ascertaining objects contained in the first object region and an object contained in the second object region being the same object, in response to determining that a degree of overlap between the first object region detected in the ascertained previous frame and the second object region detected in the ascertained subsequent frame is greater than a preset threshold and types of the contained objects are consistent.

In some embodiments, the updating unit is further configured to: change the ascertained subsequent frame to the last frame of the sequence of the video frames in response to the ascertained subsequent frame not being in a range of the sequence of the video frames, before the object region detected respectively in the ascertained previous frame and the ascertained subsequent frame is acquired.

In some embodiments, the apparatus further includes: an area ascertaining unit, configured to ascertain, from an object region having an updated confidence level in the ascertained subsequent frame, an object region having a confidence level less than a confidence level threshold; and an excluding unit, configured to ascertain the object region having the confidence level less than the confidence level threshold as a non-object region.

In some embodiments, the updating unit is further configured to: determine whether the same object is present in the object region detected in the ascertained subsequent frame and in the object region detected in the ascertained previous frame, after the confidence level of the second object region is updated based on the fusion result; and for the acquired video frames, perform, in response to determining that the same object is present in the object region detected in the ascertained subsequent frame and in the object region detected in the ascertained previous frame, linear interpolation processing on a video frame between the ascertained previous frame and the ascertained subsequent frame, to obtain an object region having the same object in the video frame between the ascertained previous frame and the ascertained subsequent frame.

In some embodiments, the updating unit is further configured to: determine whether the ascertained subsequent frame is the last frame of the sequence of the video frames, after the ascertained previous frame and the ascertained subsequent frame are updated; stop performing the update step, in response to determining that the ascertained subsequent frame is the last frame of the sequence of the video frames; and perform the update step again, in response to determining that the ascertained subsequent frame is not the last frame of the sequence of the video frames.

In some embodiments, the updating unit is further configured to: reduce, in response to determining that the same object is not present in the object region detected in the ascertained subsequent frame and in the object region detected in the ascertained previous frame, the number of the frames from the previous frame to the subsequent frame after whether the same object is present in the object region detected in the ascertained subsequent frame and in the object region detected in the ascertained previous frame is determined, and perform the update step again.

In some embodiments, the updating unit is further configured to: determine, in the update step, whether the ascertained previous frame and the ascertained subsequent frame are adjacent frames, before whether the same object is present in the object region detected in the ascertained subsequent frame and in the object region detected in the ascertained previous frame is determined; determine whether the ascertained subsequent frame is the last frame of the sequence of the video frames, in response to determining that the ascertained previous frame and the ascertained subsequent frame are the adjacent frames; stop performing the update step, in response to determining that the ascertained subsequent frame is the last frame of the sequence of the video frames; and perform the update step again, if the ascertained subsequent frame is not the last frame of the sequence of the video frames.

Figure 6:
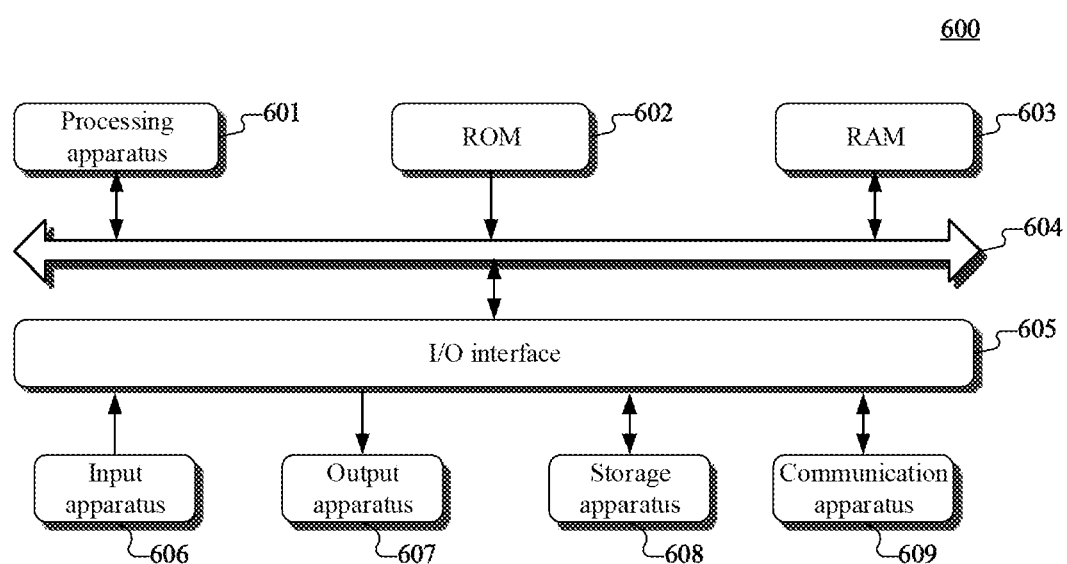
FIG. 6 is a schematic structural diagram of a computer system adapted to implement an electronic device according to some embodiments of the present disclosure.

As shown in FIG. 6, the electronic device 600 may include a processing apparatus (e.g., a central processing unit and a graphics processing unit) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following apparatuses are connected to the I/O interface 605: an input apparatus 606 including, for example, a touch screen, a touch pad, a keyboard, and a mouse, a camera, a microphone, an accelerometer and a gyroscope; an output apparatus 607 including, for example, a liquid crystal display (LCD), a speaker and a vibrator; the storage apparatus 608 including, for example, a magnetic tape and a hard disk; and a communication apparatus 609. The communication apparatus 609 may allow the electronic device 600 to exchange data with other devices by means of a wireless communication or wired communication. Although FIG. 6 illustrates the electronic device 600 having various apparatuses, it should be understood that it is not required to implement or possess all of the shown apparatuses. More or fewer apparatuses may alternatively be implemented or possessed. Each block shown in FIG. 6 may represent one apparatus, or may represent a plurality of apparatuses as needed.

In particular, according to embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication apparatus 609, may be installed from the storage apparatus 608, or may be installed from the ROM 602. The computer program, when executed by the processing apparatus 601, implements the above functionalities defined in the method of embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in embodiments of the present disclosure may be implemented by means of software or hardware. The described units may also be provided in a processor. For example, the processor may be described as: a processor including an acquiring unit, an ascertaining unit, an updating unit and a re-updating unit. Here, the names of these units do not in some cases constitute a limitation to such units themselves. For example, the acquiring unit may alternatively be described as "a unit for acquiring a sequence of video frames of a video."

In another aspect, the present disclosure further provides a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: acquire a sequence of video frames of a video; ascertain, in the sequence of the video frames, a previous frame, and ascertain, in the sequence of the video frames, a subsequent frame corresponding to the ascertained previous frame based on acquired number of frames from the previous frame to the subsequent frame; to perform a following update step: acquiring object regions detected respectively in the ascertained previous frame and the ascertained subsequent frame, and confidence levels of the object regions; ascertaining respectively a first object region and a second object region containing a same object from an object region of the ascertained previous frame and an object region of the ascertained subsequent frame; fusing a confidence level of the first object region and a confidence level of the second object region, and updating the confidence level of the second object region based on the fusion result; and updating the ascertained previous frame and the ascertained subsequent frame, the updated previous frame being the subsequent frame before the updating. The method further includes: performing the update step again, in response to the subsequent frame before the updating not being a last frame of the sequence of the video frames.

What is claimed is:

1. A method for processing a video frame, comprising:
   acquiring a sequence of video frames of a video;
   ascertaining, in the sequence of the video frames, a previous frame, and ascertaining, in the sequence of the video frames, a subsequent frame corresponding to the ascertained previous frame based on acquired number of frames from the previous frame to the subsequent frame, the acquired number representing the number of frames between the previous frame and the subsequent frame; and
   performing an update process, comprising:
      acquiring object regions detected respectively in the ascertained previous frame and the ascertained subsequent frame, and confidence levels of the object regions;
      ascertaining respectively a first object region and a second object region containing a same object from an object region of the ascertained previous frame and an object region of the ascertained subsequent frame;
      fusing a confidence level of the first object region and a confidence level of the second object region, and updating the confidence level of the second object region based on the fusion result, the fusion result being obtained by summing a product of a weight of the confidence level of the first object region and the confidence level of the first object region and a product of a weight of the confidence level of the second object region and the confidence level of the second object region; and
      updating the ascertained previous frame and the ascertained subsequent frame, the updated previous frame being the subsequent frame before the updating,
   wherein the method further comprises:
   performing the update process again, in response to the subsequent frame before the updating not being a last frame of the sequence of the video frames, and
   wherein after updating the confidence level of the second object region based on the fusion result, the update process further comprises:
   determining whether the same object is present in the object region detected in the ascertained subsequent frame and in the object region detected in the ascertained previous frame; and reducing, in response to determining that the same object is not present in the object region detected in the ascertained subsequent frame and in the object region detected in the ascertained previous frame, the number of frames between the ascertained previous frame and the ascertained subsequent frame, to update the ascertained subsequent frame to be a new subsequent frame according to the reduced number of frames, and performing the update process again by using the ascertained previous frame and the new subsequent frame.

2. The method according to claim 1, wherein the ascertaining respectively the first object region and the second object region containing the same object from the object region of the ascertained previous frame and the object region of the ascertained subsequent frame comprises:
ascertaining objects contained in the first object region and an object contained in the second object region being the same object, in response to determining that a degree of overlap between the first object region detected in the ascertained previous frame and the second object region detected in the ascertained subsequent frame is greater than a preset threshold and types of the contained objects are consistent.

3. The method according to claim 1, wherein before the acquiring the object regions detected respectively in the ascertained previous frame and the ascertained subsequent frame, the update process further comprises:
changing the ascertained subsequent frame to the last frame of the sequence of the video frames in response to the ascertained subsequent frame not being in a range of the sequence of the video frames.

4. The method according to claim 1, further comprising:
ascertaining, from an object region having an updated confidence level in the ascertained subsequent frame, an object region having a confidence level less than a confidence level threshold; and
ascertaining the object region having the confidence level less than the confidence level threshold as a non-object region.

5. The method according to claim 1, wherein after updating the confidence level of the second object region based on the fusion result, the update step further comprises:
for the acquired video frames, performing, in response to determining that the same object is present in the object region detected in the ascertained subsequent frame and in the object region detected in the ascertained previous frame, linear interpolation processing on a video frame between the ascertained previous frame and the ascertained subsequent frame, to obtain an object region having the same object in the video frame between the ascertained previous frame and the ascertained subsequent frame.

6. The method according to claim 5, wherein after the updating the ascertained previous frame and the ascertained subsequent frame, the update process further comprises:
determining whether the ascertained subsequent frame is the last frame of the sequence of the video frames;
stopping performing the update process, in response to determining that the ascertained subsequent frame is the last frame of the sequence of the video frames; and
performing the update process again, in response to determining that the ascertained subsequent frame is not the last frame of the sequence of the video frames.

7. The method according to claim 5, wherein before the determining whether the same object is present in the object region detected in the ascertained subsequent frame and in the object region detected in the ascertained previous frame, the update process further comprises:
determining, in the update process, whether the ascertained previous frame and the ascertained subsequent frame are adjacent frames;
determining whether the ascertained subsequent frame is the last frame of the sequence of the video frames, in response to determining that the ascertained previous frame and the ascertained subsequent frame are the adjacent frames;
stopping performing the update process, in response to determining that the ascertained subsequent frame is the last frame of the sequence of the video frames; and
performing the update process again, in response to determining that the ascertained subsequent frame is not the last frame of the sequence of the video frames.

8. An apparatus for processing a video frame, comprising:
at least one processor; and
a memory storing instructions, the instructions when executed by the at least one processor, causing the at least one processor to perform operations, the operations comprising:
acquiring a sequence of video frames of a video;
ascertaining, in the sequence of the video frames, a previous frame, and ascertain, in the sequence of the video frames, a subsequent frame corresponding to the ascertained previous frame based on acquired number of frames from the previous frame to the subsequent frame, the acquired number representing the number of frames between the previous frame and the subsequent frame;
performing an update process, comprising:
acquiring object regions detected respectively in the ascertained previous frame and the ascertained subsequent frame, and confidence levels of the object regions;
ascertaining respectively a first object region and a second object region containing a same object from an object region of the ascertained previous frame and an object region of the ascertained subsequent frame;
fusing a confidence level of the first object region and a confidence level of the second object region, and updating the confidence level of the second object region based on the fusion result, the fusion result being obtained by summing a product of a weight of the confidence level of the first object region and the confidence level of the first object region and a product of a weight of the confidence level of the second object region and the confidence level of the second object region; and
updating the ascertained previous frame and the ascertained subsequent frame, the updated previous frame being the subsequent frame before the updating; and
performing the update process again, in response to the subsequent frame before the updating not being a last frame of the sequence of the video frames,
wherein after updating the confidence level of the second object region based on the fusion result, the update process further comprises:
determining whether the same object is present in the object region detected in the ascertained subsequent frame and in the object region detected in the ascertained previous frame; and
reducing, in response to determining that the same object is not present in the object region detected in the ascertained subsequent frame and in the object region detected in the ascertained previous frame, the number of frames between the ascertained previous frame and the ascertained subsequent frame, to update the ascertained subsequent frame to be a new subsequent frame according to the reduced number of frames, and performing the update process again by using the ascertained previous frame and the new subsequent frame.

9. The apparatus according to claim 8, wherein the ascertaining respectively the first object region and the second object region containing the same object from the object region of the ascertained previous frame and the object region of the ascertained subsequent frame comprises:
   ascertaining objects contained in the first object region and an object contained in the second object region being the same object, in response to determining that a degree of overlap between the first object region detected in the ascertained previous frame and the second object region detected in the ascertained subsequent frame is greater than a preset threshold and types of the contained objects are consistent.

10. The apparatus according to claim 8, wherein before the acquiring the object regions detected respectively in the ascertained previous frame and the ascertained subsequent frame, the update process further comprises:
   changing the ascertained subsequent frame to the last frame of the sequence of the video frames in response to the ascertained subsequent frame not being in a range of the sequence of the video frames.

11. The apparatus according to claim 8, the operations further comprising:
   ascertaining, from an object region having an updated confidence level in the ascertained subsequent frame, an object region having a confidence level less than a confidence level threshold; and
   ascertaining the object region having the confidence level less than the confidence level threshold as a non-object region.

12. The apparatus according to claim 8, wherein after updating the confidence level of the second object region based on the fusion result, the update step further comprises:
   for the acquired video frames, performing, in response to determining that the same object is present in the object region detected in the ascertained subsequent frame and in the object region detected in the ascertained previous frame, linear interpolation processing on a video frame between the ascertained previous frame and the ascertained subsequent frame, to obtain an object region having the same object in the video frame between the ascertained previous frame and the ascertained subsequent frame.

13. The apparatus according to claim 12, wherein after the updating the ascertained previous frame and the ascertained subsequent frame, the update process further comprises:
   determining whether the ascertained subsequent frame is the last frame of the sequence of the video frames;
   stopping performing the update process, in response to determining that the ascertained subsequent frame is the last frame of the sequence of the video frames; and
   performing the update process again, in response to determining that the ascertained subsequent frame is not the last frame of the sequence of the video frames.

14. The apparatus according to claim 12, wherein before the determining whether the same object is present in the object region detected in the ascertained subsequent frame and in the object region detected in the ascertained previous frame, the update process further comprises:
   determining, in the update process, whether the ascertained previous frame and the ascertained subsequent frame are adjacent frames;
   determining whether the ascertained subsequent frame is the last frame of the sequence of the video frames, in response to determining that the ascertained previous frame and the ascertained subsequent frame are the adjacent frames;
   stopping performing the update process, in response to determining that the ascertained subsequent frame is the last frame of the sequence of the video frames; and
   performing the update process again, in response to determining that the ascertained subsequent frame is not the last frame of the sequence of the video frames.

15. A non-transitory computer readable storage medium, storing a computer program thereon, wherein the program, when executed by a processor, causes the processor to perform operations, the operations comprising:
   acquiring a sequence of video frames of a video;
   ascertaining, in the sequence of the video frames, a previous frame, and ascertain, in the sequence of the video frames, a subsequent frame corresponding to the ascertained previous frame based on acquired number of frames from the previous frame to the subsequent frame, the acquired number representing the number oft frames between the previous frame and the subsequent frame;
   performing an update process, comprising:
      acquiring object regions detected respectively in the ascertained previous frame and the ascertained subsequent frame, and confidence levels of the object regions;
      ascertaining respectively a first object region and a second object region containing a same object from an object region of the ascertained previous frame and an object region of the ascertained subsequent frame;
      fusing a confidence level of the first object region and a confidence level of the second object region, and updating the confidence level of the second object region based on the fusion result, the fusion result being obtained by summing a product of a weight of the confidence level of the first object region and the confidence level of the first object region and a product of a weight of the confidence level of the second object region and the confidence level of the second object region; and
      updating the ascertained previous frame and the ascertained subsequent frame, the updated previous frame being the subsequent frame before the updating; and
   performing the update process again, in response to the subsequent frame before the updating not being a last frame of the sequence of the video frames,
   wherein after updating the confidence level of the second object region based on the fusion result, the update process further comprises:
   determining whether the same object is present in the object region detected in the ascertained subsequent frame and in the object region detected in the ascertained previous frame; and
   reducing, in response to determining that the same object is not present in the object region detected in the ascertained subsequent frame and in the object region detected in the ascertained previous frame, the number of frames between the ascertained previous frame and the ascertained subsequent frame, to update the ascertained subsequent frame to be a new subsequent frame according to the reduced number of frames, and performing the update process again by using the ascertained previous frame and the new subsequent frame.

\* \* \* \* \*